(12) United States Patent
Carlton

(10) Patent No.: US 6,179,684 B1
(45) Date of Patent: Jan. 30, 2001

(54) FLEXIBLE GAME CALL WITH REPLACEMENT DIAPHRAGM

(75) Inventor: L. Wayne Carlton, Montrose, CO (US)

(73) Assignee: Hunter's Specialties, Inc., Cedar Rapids, IA (US)

(*) Notice: Under 35 U.S.C. 154(b), the term of this patent shall be extended for 0 days.

(21) Appl. No.: 09/086,637

(22) Filed: May 29, 1998

(51) Int. Cl.[7] .................................................. A63H 5/00
(52) U.S. Cl. ........................................ 446/207; 446/208
(58) Field of Search ................................... 446/202, 207, 446/208, 209

(56) References Cited

U.S. PATENT DOCUMENTS

| | | | |
|---|---|---|---|
| 3,811,221 | * | 5/1974 | Wilt ...................................... 446/202 |
| 3,815,283 | * | 6/1974 | Piper . |
| 4,138,800 | * | 2/1979 | Lege . |
| 4,335,539 | * | 6/1982 | Jones . |
| 4,752,270 | * | 6/1988 | Morton ................................. 446/207 |
| 4,888,903 | * | 12/1989 | Knight et al. ........................ 446/207 |
| 4,950,198 | * | 8/1990 | Repko, Jr. ............................. 446/207 |
| 4,960,400 | * | 10/1990 | Cooper ................................. 446/207 |
| 4,976,648 | * | 12/1990 | Meline ................................. 446/207 |
| 5,445,551 | * | 8/1995 | Ady ...................................... 446/209 |
| 5,735,725 | * | 4/1998 | Primos ................................. 446/207 |
| 5,803,785 | * | 9/1998 | Primos, Jr. et al. ................. 446/207 |

* cited by examiner

*Primary Examiner*—Jacob K. Ackun
*Assistant Examiner*—Jeffrey D. Carlson
(74) *Attorney, Agent, or Firm*—Simmons, Perrine, Albright Ellwood PLC

(57) ABSTRACT

A flexible game call having a flexible sound chamber coupled to a multi-part mouthpiece assembly which includes therein a removable diaphragm and a method of operating the game call in which the flexible sound chamber is manipulated to affect the tone of the sound emitted from the game call and further manipulated for affecting the general direction of the sound emanating from the game call.

1 Claim, 3 Drawing Sheets

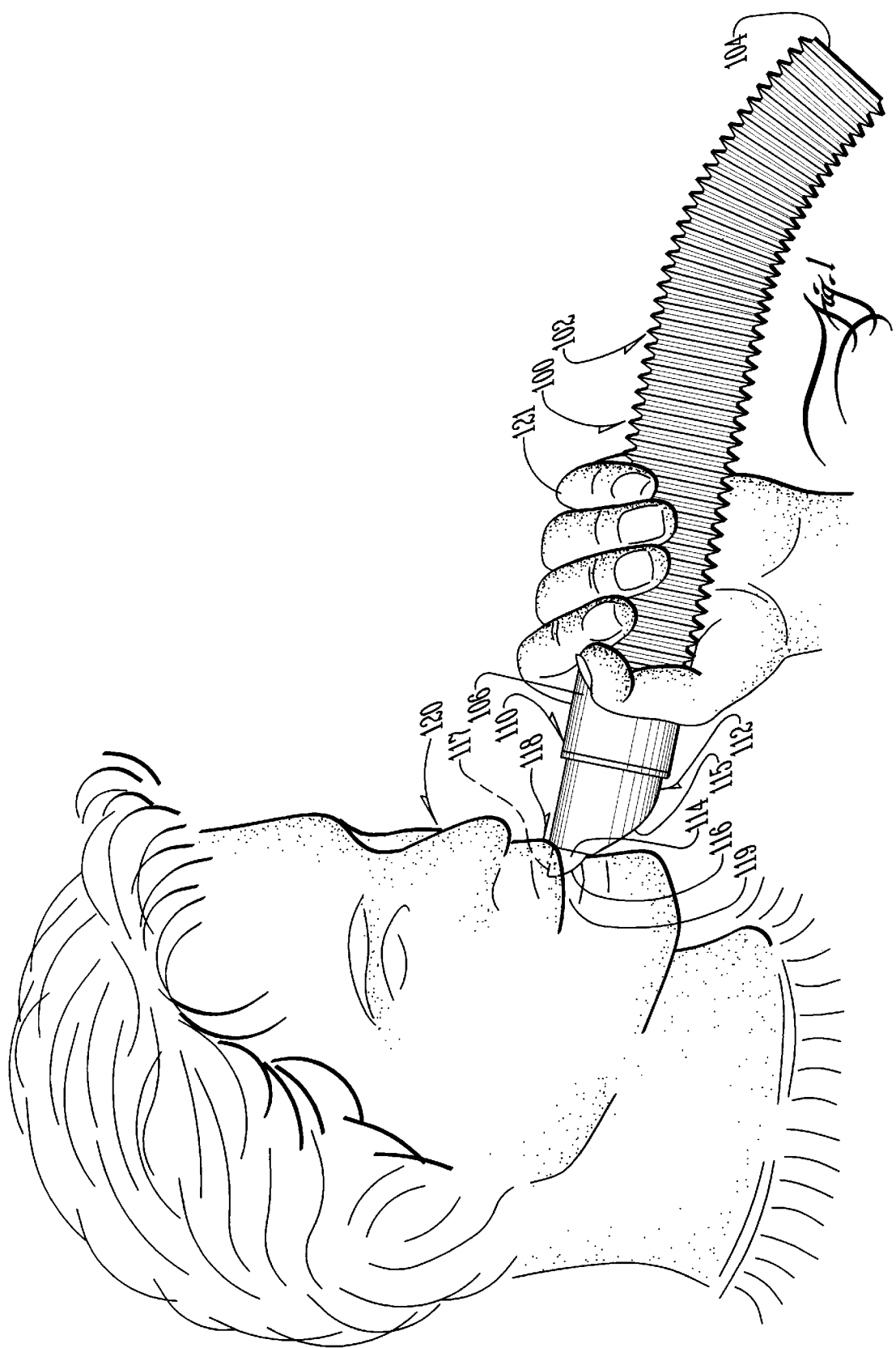

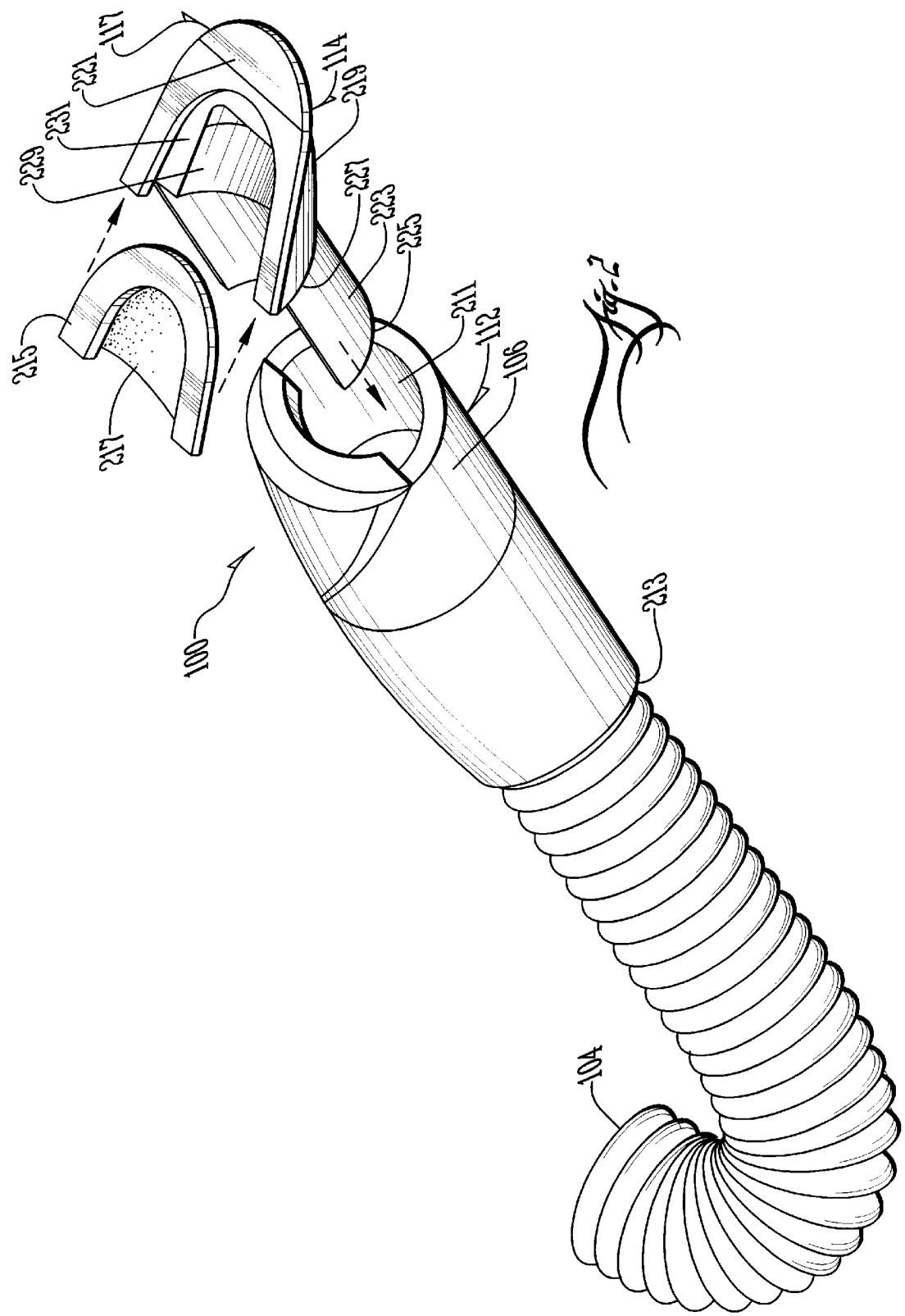

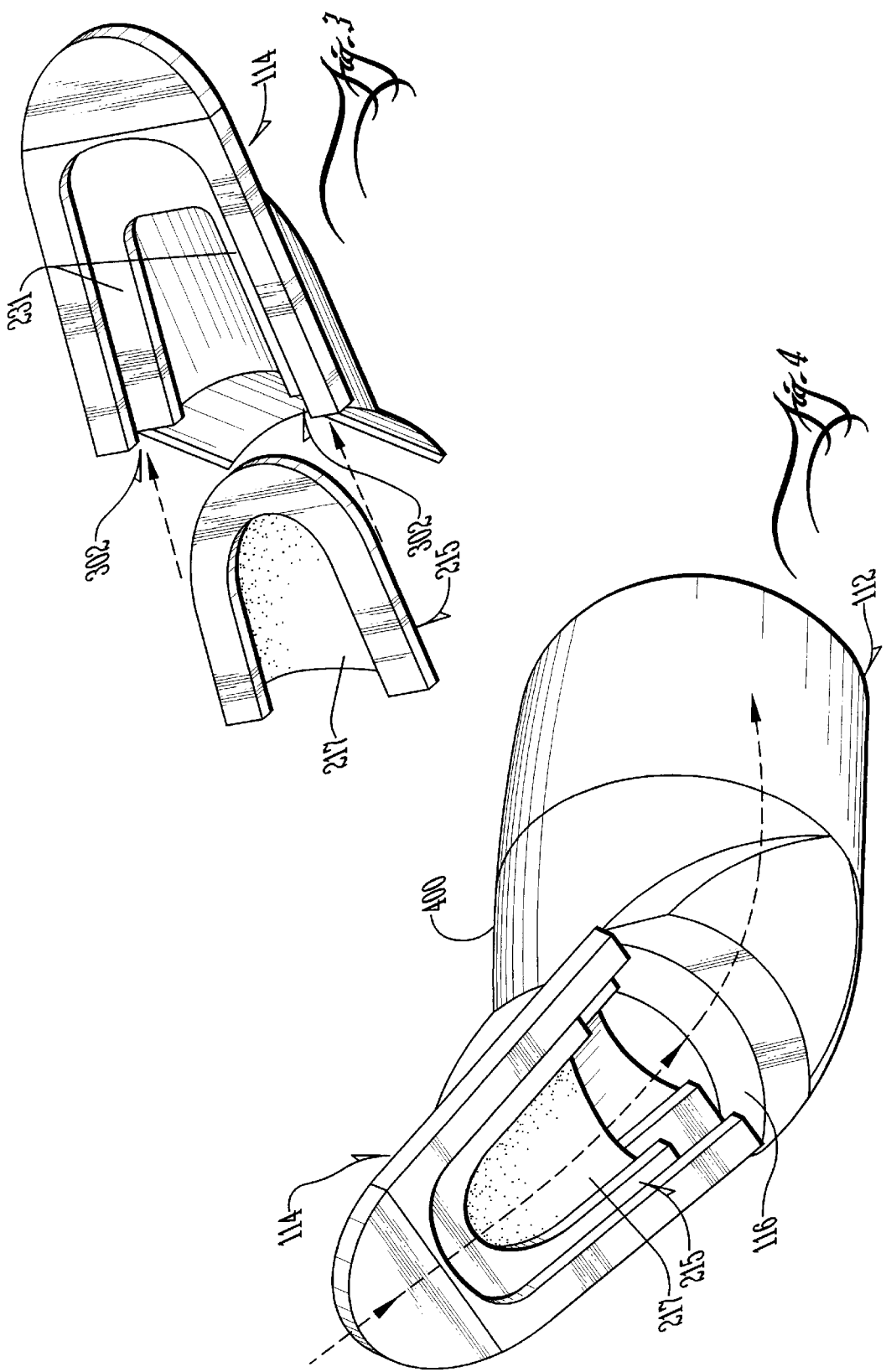

FLEXIBLE GAME CALL WITH REPLACEMENT DIAPHRAGM

BACKGROUND OF THE INVENTION

The present invention generally relates to game calls and even more particularly relates to flexible game calls and even more particularly relates to long-life flexible game calls having interchangeable diaphragms In the past, hunters have often used game calls which consist of a relatively short rigid tube having a sound-producing diaphragm affixed therein. While these types of calls and others have enjoyed considerable use in the past, they have several serious drawbacks. First of all, the typical short, rigid tube has a limited range of tones which can resonate within the call, thereby limiting the range of sound frequencies which can easily be generated within the call. Secondly, these rigid calls generally require the hunter to be facing in the same direction as he or she desires the sound to be directed. For example, if a hunter is standing behind a tree and desires to direct the sound of the call in a direction behind the tree or on the other side of the tree, she would typically be required to physically turn around and face the tree and blow the call in that direction. Often the additional motion of turning around may be just enough to visually catch the attention of nearby game, thereby alerting such game to the presence of a hunter. Another problem with the typical calls used in the past has been their relative short life span. The diaphragm typically is affixed in the call and often becomes cracked, stretched, punctured or otherwise damaged, thereby rendering the entire call useless. These and other problems have existed with typical game calls in the past.

Consequently, there exists a need for improvement in game calls which overcome the above-stated problems.

SUMMARY OF THE INVENTION

It is an object of the present invention to provide the hunter with a relatively easy method of generating a variable tone over a relatively wide range.

It is a feature of the present invention to include an elongated sound chamber.

It is an advantage of the present invention to provide for increased ability to resonate lower frequency, longer wavelength tones.

It is another object of the present invention to provide an improved apparatus and method for directing the sound output from the call to a desired direction.

It is a feature of the invention to include a flexible sound chamber.

It is another advantage of the present invention to help reduce the movement required by a hunter when the hunter desires the sound of the call to be directed in different directions.

It is yet another object of the present invention to provide a game call with a long utility life.

It is a feature of the present invention to include a removable diaphragm within the game call.

It is yet another advantage of the present invention to extend the useful life of the entire game call by allowing replacement of internal diaphragms.

The present invention is a method and apparatus for producing sound which is designed to satisfy the aforementioned needs, provide the previously stated objects, include the above-listed features, and achieve the already articulated advantages. In the present invention, the problems associated with limited tone range, limited call direction capability and limited useful life of a game call have been addressed.

Accordingly, the present invention is a method and apparatus for providing a sound of game over a wide tone range which includes an elongated flexible sound chamber and a replaceable diaphragm therein.

BRIEF DESCRIPTION OF THE DRAWINGS

The invention may be more fully understood by reading the following description of the preferred embodiments of the invention, in conjunction with the appended drawings wherein:

FIG. 1 is a perspective view of a call of the present invention showing the call immediately before it is placed in the mouth of an operator.

FIG. 2 is an enlarged exploded perspective view of the mouthpiece assembly of the call of FIG. 1 wherein the dashed lines show the direction of motion required for reassembly.

FIG. 3 is an exploded view of the diaphragm holder and diaphragm of FIG. 2 showing a slot for receiving the diaphragm.

FIG. 4 is a perspective view of the mouthpiece of FIG. 1 in an assembled configuration with the dotted line included to show direction of airflow.

DETAILED DESCRIPTION OF THE DRAWINGS

Now referring to the drawings, wherein like numerals refer to like matter throughout, and more particularly to FIG. 1, there is shown a perspective view of the game call of the present invention, generally designated 100, having a flexible sound chamber 102 which is preferably a flexible hose having an inside diameter of between 1 and 1½ inches. Such flexible tubes are generally available in the marketplace and are typically made of plastic, rubber or other pliable material. Flexible sound chamber 102 is shown having an exhaust opening 104 at a distal end and a sound chamber intake end 106 at a proximal end.

Call 100 is also shown having a mouthpiece assembly 110 which includes a mouthpiece barrel 112 having coupled thereto a diaphragm holder 114 which is disposed adjacent to a lip stop portion 116 of mouthpiece barrel 112, tip 117 of diaphragm holder 114 is inserted into the oral cavity 118 of operator 120 until lower lip 119 of operator 120 contacts lip stop 116. Mouthpiece barrel 112 may be a light-weight rigid hollow member which is made of plastic, wood, foam or other suitable material. Barrel 112 is shown having a lip stop 116 and a chin relief area 115 disposed at a proximal end. Diaphragm holder 114 is preferably a rigid material which may be similar or identical to material of barrel 112. As with barrel 112, the material for diaphragm holder 114 is preferably rugged, rigid, non-porous, light-weight, and inexpensive. However, any material which has one or more of these characteristics could be substituted for certain applications.

Also shown in FIG. 1 is the hand 121 of an operator grasping the call 100.

Now referring to FIG. 2, there is shown an enlarged exploded perspective view of the call 100 of FIG. 1 wherein the dashed lines show the direction of motion required for reassembly. Barrel 112 is shown having a barrel intake 211 and a barrel exhaust 213. Also shown is C-ring 215 which is used to support diaphragm 217. Preferably C-ring is a bi-level C-ring which includes an area between each level for receiving and retaining a diaphragm disposed therein.

C-ring 215 and diaphragm 217 are easily removed for replacement. Diaphragm 217 may be a plastic material, but other suitable materials such as paper, rubber, or metal foil could be substituted. Also C-ring 215 and diaphragm 217 could be adjusted and tuned to achieve different sound depending upon the desired effect. Adjustments in materials, dimensions and positioning can be used to affect the output of the call. Diaphragm holder 114 is shown having a top side 219 and a bottom side 221 and further having a diaphragm holder shank 223 having a shank distal end 225 and a shank proximal end 227. Diaphragm holder 114 is shown having a tone trough 229 disposed internally therein and further having a ring ledge 231 for receiving C-ring 215. Call 100 is designed to provide substantial airflow over the diaphragm when the call is blown.

Now referring to FIG. 3, there is shown an exploded view of the diaphragm holder and diaphragm of FIG. 2 showing the slot therein for receiving the diaphragm.

The dotted lines represent the direction of motion required of the C-ring 215 for reassembly in which ring 215 would rest upon ring ledge 231 and would be placed within slot 302 of diaphragm holder 114.

Now referring to FIG. 4, there is shown a perspective view of the mouthpiece assembly of FIG. 1 in an assembled configuration with the dotted line indicating the direction of airflow during normal operation and further showing an air passage 400 which is bounded by the diaphragm 217, the C-ring 215, and the lip stop portion 116 of mouthpiece barrel 112.

In operation, the game call 100 is inserted into the oral cavity 118 of operator 120 so that lip 119 contacts lip stop 116 and diaphragm holder 114 is largely enclosed in oral cavity 118. The operator 120 expresses air outwardly and across diaphragm 217 and through air passage 400 and there on through the hollow portion of barrel 112 and the flexible sound chamber 102 and ultimately exiting game call 100 through exhaust opening 104 which is manipulated to point in different directions.

In operation the call is assembled as follows: the diaphragm is slid into the diaphragm holder, which is inserted into the mouthpiece barrel, which is inserted into the flexible sound chamber.

It is thought that the method and apparatus of the present invention will be understood from the foregoing description, and it will be understood from the foregoing description that it will be apparent that various changes may be made in the form, construction, steps and arrangement of the parts and steps without departing from the spirit and scope of the invention or sacrificing all of the material advantages. The form herein described being merely a preferred or exemplary embodiment thereof.

I claim:

1. A game call comprising:

a flexible airway having an assembly receiving hole therein;

an assembly having a first removable diaphragm therein, said assembly detachably coupled to said airway through said assembly receiving hole;

wherein said flexible airway is a hose;

wherein said assembly further having a shank member for insertion into said assembly receiving hole and a mouthpiece section for cooperation with a mouth of an operator;

wherein said assembly further having a slot therein containing a diaphragm retainer;

wherein said first removable diaphragm is disposed in said diaphragm retainer;

wherein said flexible airway has a cap disposed at one end of said airway and said cap further having therein said assembly receiving hole;

wherein said cap has a recessed region thereon for cooperation and contact with a chin of said operator;

whereby said game call can be upgraded with a second removable diaphragm by detaching the assembly from said airway and then removing and replacing said first removable diaphragm.

\* \* \* \* \*